United States Patent
Chraibi et al.

(10) Patent No.: US 10,368,420 B2
(45) Date of Patent: Jul. 30, 2019

(54) APPARATUS AND METHODS THEREOF FOR CONTROLLING LIGHT EMITTING DEVICES

(71) Applicant: SIGNIFY HOLDING B.V., Eindhoven (NL)

(72) Inventors: Sanae Chraibi, Eindhoven (NL); Berent Willem Meerbeek, Eindhoven (NL); Remco Magielse, Tilburg (NL); Bartel Marinus Van De Sluis, Eindhoven (NL); Dzmitry Viktorovich Aliakseyeu, Eindhoven (NL); Dirk Valentinus Rene Engelen, Heusden-Zolder (BE); Jonathan David Mason, Waalre (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/566,855

(22) PCT Filed: Apr. 8, 2016

(86) PCT No.: PCT/EP2016/057732
§ 371 (c)(1),
(2) Date: Oct. 16, 2017

(87) PCT Pub. No.: WO2016/166023
PCT Pub. Date: Oct. 20, 2016

(65) Prior Publication Data
US 2018/0132336 A1    May 10, 2018

(30) Foreign Application Priority Data
Apr. 16, 2015 (EP) .................................. 15163867

(51) Int. Cl.
*H05B 37/02* (2006.01)
*G06F 3/02* (2006.01)
*G06F 3/01* (2006.01)

(52) U.S. Cl.
CPC ..... *H05B 37/0227* (2013.01); *H05B 37/0272* (2013.01); *G06F 3/01* (2013.01); *G06F 3/011* (2013.01); *G06F 3/02* (2013.01)

(58) Field of Classification Search
CPC ......... H05B 37/0272; G06F 3/01; G06F 3/02; G06F 3/011
See application file for complete search history.

(56) References Cited

U.S. PATENT DOCUMENTS

| | | | |
|---|---|---|---|
| 2012/0101554 A1 | 4/2012 | Feather et al. | |
| 2013/0134891 A1* | 5/2013 | Woytowitz | H05B 37/02 315/201 |
| 2015/0035440 A1* | 2/2015 | Spero | B60Q 1/04 315/153 |

FOREIGN PATENT DOCUMENTS

WO    2010143089 A1    12/2010

* cited by examiner

*Primary Examiner* — Thuy V Tran
(74) *Attorney, Agent, or Firm* — Meenakshy Chakravorty

(57) ABSTRACT

The present application relates to a lighting control apparatus (2) configured to control light emitted from at least one light emitting device (4) using one or more control signals (6). The apparatus (2) uses data (10) associated with a physiological or cognitive state of a user to determine an appropriate control signal (6) to send to the light emitting device (4) when light control input data (8) is provided via a light control input device (30). The apparatus (2) is used in conjunction with a network of lights providing different combinations of intensity and hue. Also presented is a (Continued)

method (14) for controlling light emitted from at least one light emitted device (4) using one or more control signals (6).

15 Claims, 5 Drawing Sheets

APPARATUS AND METHODS THEREOF FOR CONTROLLING LIGHT EMITTING DEVICES

CROSS-REFERENCE TO PRIOR APPLICATIONS

This application is the U.S. National Phase application under 35 U.S.C. § 371 of International Application No. PCT/EP2016/057732, filed on Apr. 8, 2016, which claims the benefit of European Patent Application No. 15163867.3, filed on Apr. 16, 2015. These applications are hereby incorporated by reference herein.

FIELD OF THE INVENTION

The field of the invention is concerned with controlling the light emitted by light emitting devices. In particular, the field of the invention is concerned with controlling the light emitted from a plurality of light emitting devices in a lighting control network using input data.

BACKGROUND OF THE INVENTION

People often have different preferences and needs concerning light. These needs can be personal e.g. a person might prefer to have certain colours in a light scene. The needs may additionally or alternatively be related to a biological state of the human body e.g. being sleepy, alert, or being in a particular mood that can be affected by light. It is known that exposure to light can influence production of hormone melatonin that regulates sleep-wake rhythm. Studies (Boyce P R. Human Factors in Lighting. 2nd edition, Lighting Research Center, Taylor and Francis group London and New York, 2003) have shown that by exposing people to bright light during the day, their alertness can be increased, but also sleep-wake rhythms can be shifted when exposing people to bright light in the evenings for example for night workers (Bommel W J M van, Beld G J van den. Lighting for work: a review of visual and biological effects. Lighting Res. Technol., 2004. 36: 255-269).

These preferences or needs may be different for individuals living in one household or sharing a space. With the trend of smaller houses the number of users in one space increases enlarging the risk of conflicting preferences.

Connected lighting systems exist that allow a user to control and provide a diverse range of lighting conditions and behaviors within a given space, for example a room. Such systems typically have at least one, often a plurality of, light emitting devices in communication with and controllable via a central lighting control apparatus. The central lighting control apparatus in turn has the ability to accept an input from a user to control the light emitting devices in a network. Some systems have the ability to accept multiple light control inputs from multiple users.

Connected lighting systems may therefore provide a large diversity of light conditions, which increases the likelihood that user input preferences are contradictory.

An example of a connected lighting system is described in Patent document WO2010143089 A1. This document describes systems and methods for automatically deriving and modifying personal preferences applicable to controllable lighting networks. In one aspect the system has an awareness module that detects an identifier for a user, a plurality of adjustments to the at least one controllable lighting network requested by the user, and a context corresponding to each of the plurality of adjustments. An inference engine analyses the plurality of adjustments and the corresponding contexts to identify a correlation between the plurality of adjustments and the contexts, and creates at least one personal preference rule associated with the identifier of the associated user based on the identified correlation. WO2010143089 A1 also describes a method for adjusting a personal preference rule of one user based on criteria of a second user. In this method, a personal preference rule and a first set of criteria are identified for a first user, the personal preference rule having a likelihood value and created based on a correlation between a plurality of adjustments to the controllable lighting network requested by user. Contexts are also identified for the plurality of adjustments. The method also identifies a second set of criteria for at least one second user and compares the first set of criteria with the second set of criteria. The method then adjusts the likelihood value of the personal preference rule based on the comparison and stores the personal preference rule in a preferences database with the user identifier.

Despite such known systems that utilize sets of different criteria to control lighting, peoples lighting needs or preferences may not be a single predefined set of criteria but may vary depending on a number of factors including current physiological state and/or cognitive behavior. Furthermore, new users to the system may not yet have entered any personal preferences or criteria associated with their lighting needs when they enter or are otherwise within a space utilizing a controlled lighting network. Such new users may therefore not have their lighting needs considered by existing lighting systems.

SUMMARY OF THE INVENTION

It is an object of the invention to provide a lighting control apparatus and method for controlling the light emitted from at least one light emitting device which substantially alleviates or overcomes the problems mentioned above.

According to a first aspect, there is provided a lighting control apparatus for controlling the light emitted from at least one light emitting device using one or more control signals; the apparatus comprising: a lighting input receiving device for receiving light control input data associated with a first user; a user data receiving device for receiving data associated with a physiological or cognitive state of a second user; a processor for generating the one or more control signals based upon the light control input data and the data associated with a physiological or cognitive state of the second user; a lighting control output unit configured to output the one or more control signals.

The lighting control apparatus therefore uses data associated with one (or more) physiological and/or cognitive states of a user together with desired input light data associated with another user to control the light emitting device. If the light control input data is input from a user and is set to produce a lighting effect that is disagreeable with another user's mood or physiological state then the apparatus may modify the control signals sent to the light emitting device/s to take this into account. Another advantage of this apparatus is that a user does not necessarily have to manually input his or her lighting preferences in order for the apparatus to consider his or her lighting needs. A 'new' person in a room managed by the apparatus of the present disclosure may be detected as 'sleeping' by a monitoring device, such as a wearable monitoring device upon the new user. If the monitoring device automatically sends the sleeping cognitive/physiological data to the apparatus, the apparatus may send control signals to turn the lights down without the user needing to manually input any lighting preferences.

The first aspect may be modified in any suitable way as disclosed herein including but not limited to any one or more of the following configurations.

The apparatus may be configured such that the one or more light emitting devices are located within a lighting space: the apparatus being configured to receive data indicating the presence of the second user within the lighting space and, the processor being configured to generate the one or more control signals further based on the indicating data.

Indicating data enables the apparatus to determine who the physiological or cognitive state corresponds to as well as the presence of multiple people in the room. This in turn may allow the apparatus to prioritize or determine the control signals sent to the light emitting device. For example, if the physiological or cognitive state data is that corresponding to a new-born baby then the control signals sent to the light emitting device may need to be different than if the same physiological or cognitive state data was from an adult. The indicating data may also comprise or refer to a user profile comprising for example an indicating of a range of lighting effect that are allowable/compatible with a physiological or cognitive state data for that user or user profile.

The light control input data may be associated with a first light output state from the at least one light emitting device; the one or more control signals may be associated with a second light output state from the at least one light emitting device; the first light output state being different from the second light output state.

By being able to output a control signal that gives rise to a different light output state than initially requested, the apparatus may modify the lighting request to take into account another user's physiological or cognitive state.

The apparatus may be configured such that: the at least one light emitting device is configured to output a plurality of different light output states; the light control input data corresponding to a light output state within a first range of light output states; and the processor is configured to generate the one or more control signals to correspond to one or more light output states within a second range of light output states; the second light output state range being different to the first light output state range; the processor being configured to: modify the light control input data to correspond to a light output state within the second light output state range; generate the one or more control signals using the modified light control input data; or, generate the one or more control signals using the light control input data only if the light control input data corresponds to a light output state within the second light output state range.

The apparatus may therefore modify the output range of control signals to take into account the physiological or cognitive state of a user. For example, only allowing lights to be turned on to 10% of the original requested intensity if the physiological state data indicated a person is sleeping in the same room. The apparatus may translate the light control input data values into control signal values that correspond to a limited range of light control. The user inputting the light control data may therefore still control the variability of the lighting but only to an extent acceptable to the physiological or cognitive state of another user in the same environment. Alternatively, the apparatus may only permit light control input data to be actioned into a control signal when those input data requests are within the acceptable lighting regimes dictated by the physiological or cognitive state data. For example a user submits lighting control input data into the apparatus requesting that red, blue and green hues are output in different areas of the room. The apparatus only permits the green and blue hues to be output due to physiological or cognitive state data determining that another person is in an aggravated state.

The processor may be configured to: select predetermined control information based upon the data associated with a physiological or cognitive state of the second user; and, generate the one or more control signals using the selected predetermined control information.

Using a control signal based upon predetermined control information associated with a physiological or cognitive state allows a user to make sure that a known lighting effect is output when he or she is in a particular mood or state of activity. This can be particularly important for those who are sensitive to lighting effects and want to know that only a specific lighting condition is output when they are in a particular state. For example, a user may know that he or she always needs complete darkness when sleeping, so the predetermined control signal may be to have zero light intensity when he or she is in this state.

The apparatus may be configured such that the processor is configured to: access a predetermined set of control information based upon the data associated with a physiological or cognitive state of the second user; and, select control information from the predetermined set based on the light control input data; and, generate the one or more control signals using the selected control information.

Using a predetermined set of control signals associated with a physiological or cognitive state allows a user to make sure that only a known number of lighting effects may be output. This can be particularly important for those who are sensitive to lighting effects and want to know that only specific lighting conditions are output when they are in a particular state. For example, a user may know that he or she always needs blue or green light when in a stressed state. Another user enters the room and requests red and blue light to be emitted. The apparatus compares the request to the predetermined set and selects/sends only control signals to emit blue light.

The apparatus may be configured such that the lighting control output unit is configured to output one or more control signals to a lighting control network comprising a plurality of light emitting devices.

By having the apparatus controlling a lighting control network with multiple light emitting devices, the apparatus can output various lighting effects (for example different intensity, hue and spatial lighting configurations) that may more suitably match the physiological or cognitive state of the user.

There may also be provided a system comprising an apparatus as described in the first aspect (and/or elsewhere herein), the system further comprising a wearable device configured to: be worn on the second user; and, monitor a physiological or cognitive state of the second user; and, output the data associated with the physiological or cognitive state of the second user to the user data receiving device.

Monitoring the physiological or cognitive state of a user with a wearable device and transmitting the physiological or cognitive state data to a remote apparatus allows the apparatus to efficiently monitor multiple people within a given space without requiring existing monitoring apparatus within the lighting space. Furthermore each wearable device can be used to submit a user identifier so that the apparatus has a simple way to determine who is in the lighting space and therefore how to output the control signals.

The system may further comprise a light control input device configured to: receive an input request from the first user; the request associated with the light control input data; output the light control input data (8) data to the lighting input receiving device.

Having a lighting control input device that can send data to the apparatus allow the system to locate the apparatus in a convenient location whilst positioning the input device in a suitable location for a user.

The system may comprise the at least one light emitting device.

According to a second aspect, there is provided a method for controlling the light emitted from at least one light emitting device using one or more control signals; the method comprising the steps of: in any order: receiving light control input data associated with a first user; receiving data associated with a physiological or cognitive state of a second user; generating, using a processor, one or more control signals based upon the light control input data and the physiological or cognitive state data; outputting the one or more control signals to the at least one light emitting device.

The method therefore uses data associated with one (or more) physiological and/or cognitive states of a user together with desired input light data associated with another user to control the light emitting device. If the light control input data is input from a user and is set to produce a lighting effect that is disagreeable with another user's mood or physiological state then the method may modify the control signals sent to the light emitting device/s to take this into account. Another advantage of this method is that a user does not necessarily have to manually input his or her lighting preferences in order for the apparatus to consider his or her lighting needs. A 'new' person in a room managed according to the method may be detected as 'sleeping' by a monitoring device, such as a wearable monitoring device upon the new user. If the monitoring device provides the sleeping cognitive/physiological data, the method may send control signals to turn the lights down without the user needing to manually input any lighting preferences.

The second aspect may be modified in any suitable way as disclosed herein including but not limited to any one or more of the following configurations.

One or more light emitting devices may be located within a lighting space; the method may comprise the steps of: receiving data indicating the presence of the second user within the lighting space and, generating the one or more control signals further based on the indicating data.

Indicating data enables the method to determine who the physiological or cognitive state corresponds to as well as the presence of multiple people in the room. This in turn may allow the method to prioritize or determine the control signals sent to the light emitting device. For example, if the physiological or cognitive state data is that corresponding to a new-born baby then the control signals sent to the light emitting device may need to be different than if the same physiological or cognitive state data was from an adult.

The light control input data may be associated with a first light output state from the at least one light emitting device; the one or more control signals may be associated with a second light output state from the at least one light emitting device; the first light output state being different from the second light output state.

By being able to output a control signal that gives rise to a different light output state than initially requested, the method may modify the lighting request to take into account another user's physiological or cognitive state.

The at least one light emitting device may be configured to output a plurality of different light output states; the light control input data may correspond to a light output state within a first range of light output states; and, the method may comprise the steps of: generating the one or more control signals to correspond to one or more light output states within a second range of light output states; the second light output state range being different to the first light output state range; and any of the steps of: modifying the light control input data to correspond to a light output state within the second light output state range; generating the one or more control signals using the modified light control input data; or, generating the one or more control signals using the light control input data only if the light control input data corresponds to a light output state within the second light output state range.

The method may therefore modify the output range of control signals to take into account the physiological or cognitive state of a user. For example, only allowing lights to be turned on to 10% of the original requested intensity if the physiological state data indicated a person is sleeping in the same room. The method may translate the light control input data values into control signal values that correspond to a limited range of light control. The user inputting the light control data may therefore still control the variability of the lighting but only to an extent acceptable to the physiological or cognitive state of another user in the same environment. Alternatively, the method may only permit light control input data to be actioned into a control signal when those input data requests are within the acceptable lighting regimes dictated by the physiological or cognitive state data. For example a user submits lighting control input data requesting that red, blue and green hues are output in different areas of the room. The method may only permits the green and blue hues to be output due to physiological or cognitive state data determining that another person is in an aggravated state.

The method may further comprise the steps of: selecting predetermined control information based upon the data associated with a physiological or cognitive state of the second user; and, generating the one or more control signals using the selected predetermined control information.

Using a control signal based upon predetermined control information associated with a physiological or cognitive state allows a user to make sure that a known lighting effect is output when he or she is in a particular mood or state of activity. This can be particularly important for those who are sensitive to lighting effects and want to know that only a specific lighting condition is output when they are in a particular state. For example, a user may know that he or she always needs complete darkness when sleeping, so the predetermined control signal may be to have zero light intensity when he or she is in this state.

These and other aspects of embodiments of the invention will be apparent from and elucidated with reference to the embodiments described hereinafter.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

Figure 1:
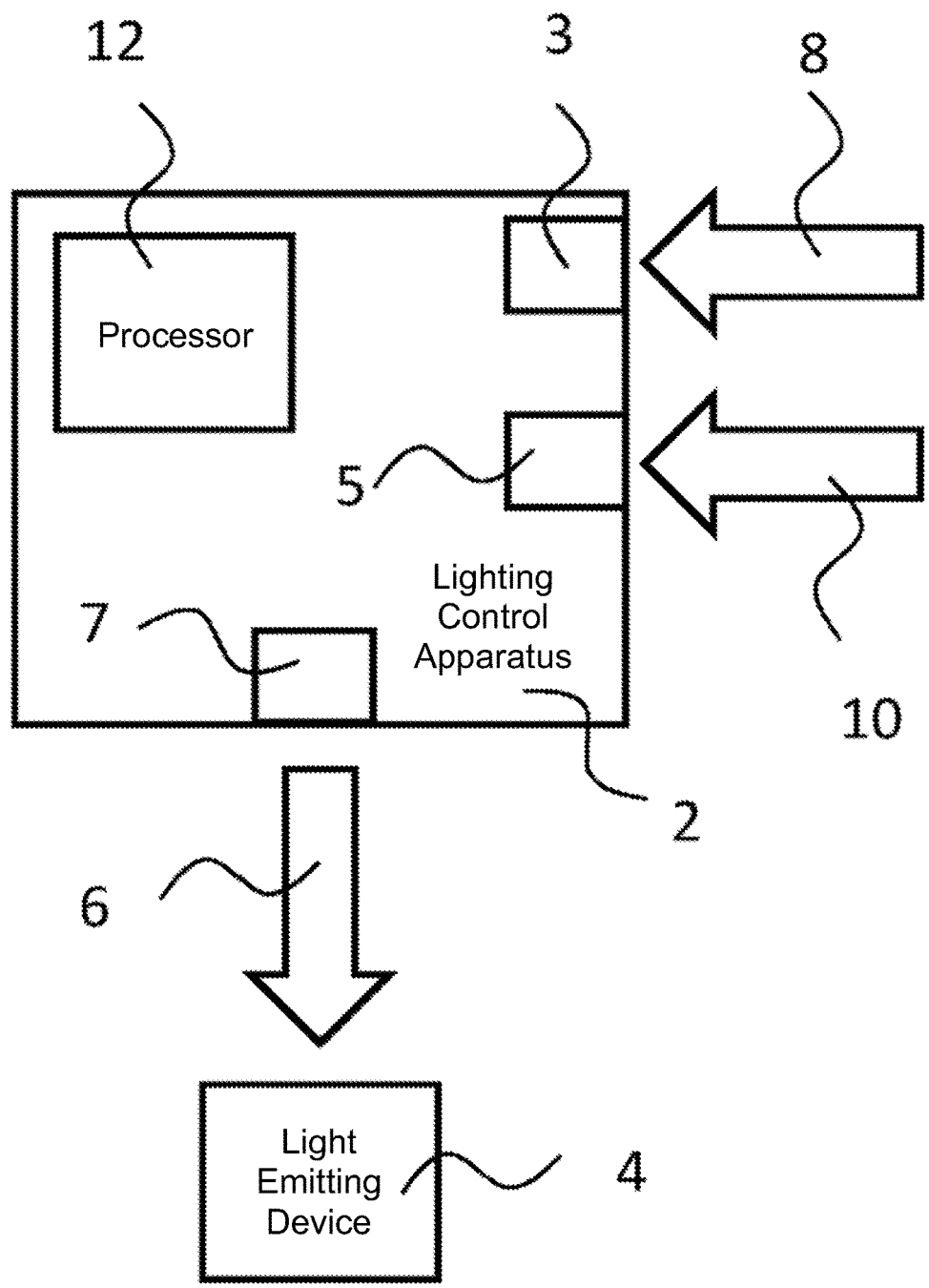
FIG. 1 shows a schematic diagram of a lighting control apparatus.

FIG. 1 shows a schematic diagram of lighting control apparatus 2 configured to control the light emitted from at least one light emitting device 4 using one or more control signals 6. The apparatus 2 comprises one or more lighting input receiving devices 3 to receive light control input data 8 associated with a first user. The apparatus 2 also comprises one or more a user data receiving devices 5 for receiving data 10 associated with a physiological or cognitive state of a second user. The one or more lighting input receiving devices 3 for receiving the light control input data 8 may be different devices to the one or more user data receiving devices 5 for receiving the data 10 associated with a physiological or cognitive state of a user (which may also be referred to herein as 'state' data). Alternatively the one or more lighting input receiving devices 3 may be the same device/s as the one or more user data receiving devices 5, i.e. the same receiving device or devices may be configured to receive both the light control input data 8 and the state data 10.

Typically the light control input data 8 takes the form of a lighting request input by the first user (for example via light setting input device 30 on a wall), but in principle may be data 8 input via other means including via one or more sensors that detect the presence of the first user, where the sensor data is used to provide the input data 8 to the apparatus 2. Such input data 8 may be, for example, any of: a standard light setting associated with any user entering a lighting control space, a default lighting preference of the first user, or a light setting determined from a physiological or cognitive state of the first user. Sensors may be used to detect a gesture from a first user wherein the sensor data associated with the detected gesture is used to determine the light control input data 8. Gestures may include the movement of a limb or other part of the body, for example the waving of a hand or the shaking or nodding of the first user's head. The sensors may detect the movement and send the movement data to a gesture processing unit which determines the gesture and the appropriate lighting control data 8 that should be input to the apparatus 2.

The apparatus 2 also comprises a processor 12 that is used to generate the one or more control signals 6 based upon the light control input data 8 and the physiological or cognitive state data 10. Upon generating the control signals 6, the apparatus 2 outputs the one or more control signals 6 to the at least one light emitting device 4 using a lighting control output unit 7. The processor 12 may generate the control signals 6 based further upon a plurality of state data 10 from a corresponding plurality of users. The light control output unit 7 may be any suitable device or set of devices for outputting control signals to the light emitting device/s 4 and may include communications equipment 24. In some of the examples described herein where reference is made to communications equipment 24 of an apparatus, this may be, in principle, any type of light control output unit 7 that can output control signals to a light emitting device 4.

The components of the apparatus 2 such as the processor 12, devices 3, 5 for receiving the data 8, 10 and the lighting control output unit 7 may be co-located within a single control device. Alternatively, components or groups of components may be located remotely from each other. For example the devices for receiving data 8, 10 and the lighting control output unit 7 may be co-located into a single control unit whilst the processor 12 may be remotely located away from the control unit (such as a processor in the cloud).

The one or more lighting input receiving devices 3 may be any device in principle including, but not limited to, any one or more of: a user interface; an input device 30 that the first user inputs a light control request upon; one or more communications devices 28 that receives the data 8 through a wired or wireless connection to such a user interface or input device 30. In some of the examples described herein where reference is made to an apparatus communications device 28, this may be, in principle, any type of lighting input receiving device 3.

Similarly, the one or more user data receiving devices 5 may be any device in principle including, but not limited to, any one or more of: an electronic device coupled to an electronic circuit that receives the state data 10 from a state monitoring device connected to the same circuit; an electronic device coupled to an electronic circuit that receives the state data 10 from a further processor coupled to the same circuit (wherein the further processor processes one or more pieces of further data (such as raw data) to determine the state data 10); one or more communications devices 28 that receives the state data 10 through a wired or wireless connection to a further device. The further device may be any one or more of, but not limited to: a monitoring device or further processing device that generates the state data 10.

The one or more communication devices 28 used to receive the light control input data 8 from a first user may be the same as, or different to, the one or more communication devices 28 used to receive the data 10 associated with a physiological or cognitive state of a second user.

The apparatus 2 is preferably configured to receive and/or process state data 10 from users within a lighting control space, such as within a room of a building. The lighting control space may however also comprise multiple rooms in a building, in which case the apparatus 2 is for example suitable for controlling light emitting devices connected in a network across multiple rooms or in an entire building. Many of these networked light systems can be operated via graphical user interfaces or app's on mobile devices communication wirelessly with a network controller or bridge and hence light control input data 8 may be received from within any location in any room of the building for any light emitting device in any other room of the building. In a examplary use case, a first user (e.g. a parent) may want to, from within one room (e.g. a living room), switch off the lighting in another room (e.g. a study room), being unaware that a second user (e.g. a child) is still present in that room and his physiological or cognitive state indicated that he is studying and therefore needs light.

The lighting control space may be defined or determined using any method or technique in principle including, but not limited to, any one or more of: being predefined, being static (i.e. the control space does not change over time with the input of different state data 10 and/or lighting control data 8); being dynamic (i.e. the control space can change over time with the input of different state data 10 and/or lighting control data 8, and/or other data affecting the control space such as the opening of an opaque door that links two rooms); being determined using a threshold value of light intensity at one or more locations about the light emitting devices 4 (for example a large open plan room may not consider state data 10 from a user around a corner that is not directly illuminated by at least one light emitting device 4).

The determination of whether a user has entered into or is still currently within the control space may be determined in any suitable way. In one example, data indicating the presence of one or more users is sent to the apparatus 2. The apparatus may generate the control signals based upon this user indication. This may be, for example, only generating the signals when such indicating data is received.

The determination of user presence may include, but is not limited to, using any one or more of: sensors/detectors to detect the presence of a user (such as visible or infra-red optical sensors, motion sensors, floor pressure sensors, sound detectors or detection systems such as a microphone triangulation system); the successful input of a user identifier to the apparatus 2 from a device that the user is carrying (indicating that a user device is within a particular communication proximity to the apparatus 2). Such sensors and detectors may be located in fixed positions about the control space. Additionally or alternatively one or more of the sensors/detectors may be located upon a mobile device within the control space, for example a person's mobile phone detecting the local presence of other user mobile phones using Bluetooth® communication. The detectors may, for example, determine the presence of a first user next to a light control input device 30 (such as a light switch) and a second user next to a bed. With such a situation the apparatus 2 may expect a light control input data to be received and invoke a lighting rule to apply to the forthcoming input data to take into account the probable physiological state of a user on a bed. Alternatively, given the same sensor information, the apparatus may send out "state data 10 retrieve" signals when it detects a person nearing the light switch so it can get the latest state data 10 from other users before the desired lighting input is entered.

The input of state data 10 into the apparatus 2 may be initiated by a variety of ways including but not limited to any one or more of: requests for state data 10 broadcast or directly sent from the apparatus 2 to a device associated with each detected user (such as a user's state monitoring device or mobile device in communication with the monitoring device); the detection of a new user in the control space; the upload of a change in state of at least one user in the control space leading to requests for other state data 10 of other users before the apparatus 2 makes any changes to a lighting scene. Additionally or alternatively the state data 10 may be communicated to the apparatus 2 automatically by a device associated with a user, for example a wearable state monitoring device or other mobile device communicating state data 10 to the apparatus periodically or upon the detection or determination of a change of user state.

In one example the user detection method may use a system similar to iBeacon®.

In one example, one or more sensors are located in fixed positions about the lighting control space. The sensors periodically send out signals to establish the presence of any new users and to see which existing users within the control space are still there. A user's mobile device or wearable device runs software to look for such signals. The signal from the sensor, for example a sensor ID, may include communication instructions for the mobile or wearable to communicate with the apparatus 2, hence be able to subsequently upload state data 10 to the apparatus 2. The apparatus 2 in this example may be a central control unit, such as a communications bridge, comprising communication devices 28 to receive the lighting control input data 8 and the state data 10; a processor 12 for generating the control signals and a lighting control output unit 7 for outputting the control signals 6 to the light emitting devices 4.

Once a signal is established between the sensor/s and the mobile device or wearable, the apparatus 2 may become aware of the new user via: a) the mobile device initiating the contact with the apparatus 2; or b) the sensor receiving a communication back from the mobile/wearable and then forwarding details of the mobile or user from the sensor to the apparatus 2.

Figure 2:
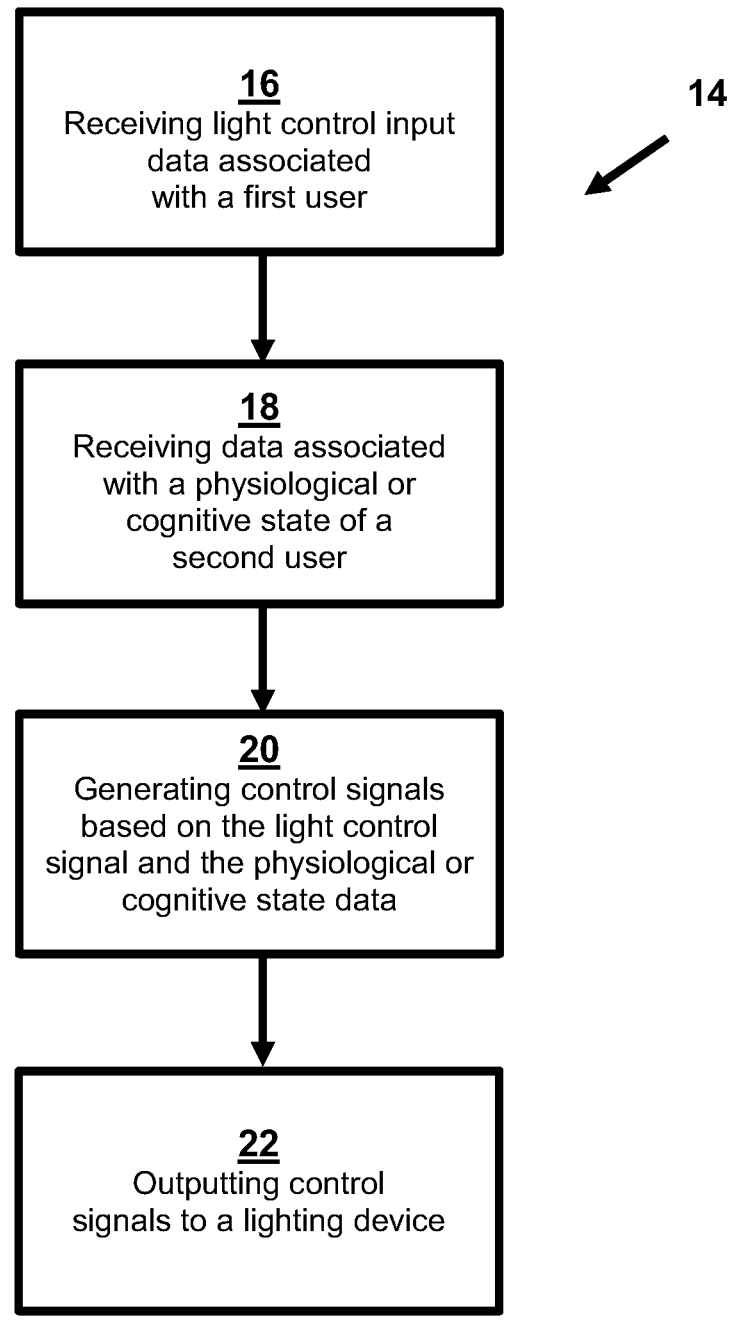
FIG. 2 shows a schematic diagram of a method for controlling the light emitted from at least one light emitting device.

FIG. 2 shows a schematic diagram of a method 14 for controlling the light emitted from at least one light emitting device 4. The method 14 comprises the steps of: receiving 16 light control input data 8 associated with a first user; receiving 18 data associated with a physiological or cognitive state of a second user; generating 20, using a processor 12, one or more control signals 6 based upon the light control input data 8 and the physiological or cognitive state data 10; outputting 22 the one or more control signals 6 to the at least one light emitting device 4. The method 14 is preferably executed by the apparatus 2 described herein.

The lighting control apparatus 2 uses data 10 associated with a physiological or cognitive state of one user and a desired light control input data 8 originating from another user to control the light emitting device 4. This data may be any of: raw data from a monitoring device, inferred physiological or cognitive state data using the raw data and/or other data sources; or historical data as described below. If the light control input data 8 from a first user is set to produce a lighting effect that is disagreeable with a second (or further) user's mood or physiological state then the apparatus 2 may modify the control signals 6 sent to the light emitting device/s 4 to take this into account. For example, a request is input to the apparatus 2 to turn the lights on to full brightness. The physiological state data 10 however indicates another user within the same room is in a stressed state. The apparatus 2 therefore generates control signals 6 and sends them to the light emitting device 4 to output light at full brightness but to emit a calming hue for the stressed person (for example an amber-white colour).

The apparatus 2 or method 14 may, in principle, be used in any number of scenarios or locations including household lighting, commercial premises, hospitals and care homes.

Any of the lighting control apparatus 2 examples described herein may form part of a system. The system may comprise one or more light emitting devices 4. The light emitting devices 4 and apparatus 2 may have complementary communication equipment 24 configured, at least, for sending signals from the apparatus 2 to the light emitting devices 4. The lighting control output unit 7 may comprise the communication equipment 24. Additionally or alternatively the system may also comprise one or more sensors configured to detect the presence of a user within a lighting control space. Additionally or alternatively the system may also comprise one or more monitoring devices 26 configured to provide the physiological or cognitive state data 10 to the apparatus 2. The monitoring devices 26 and apparatus 2 may have complementary communication equipment 28 configured, at least, for sending signals from the monitoring devices 26 to the apparatus 2. Additionally or alternatively the system may also comprise one or more input devices 30 configured to provide the light control input data 8 to the apparatus 2. The input devices 30 and apparatus 2 may have complementary communication equipment 28 configured, at least, for sending signals from the input devices 30 to the apparatus 2. As stated above, the communication equipment 28 of the apparatus 2 for communicating with the monitoring devices 26 may be the same as, or different to, the communication equipment 28 of the apparatus 2 for communicating with the input devices 30. Any of the communication equipment/devices described herein may be configured to both transmit and receive communication signals. An examples of such equipment 24, 28 may be RF wireless communication devices such wireless transmitters and receivers.

Lighting Control Apparatus

The apparatus 2 may comprise a lighting control configurator that is used to design/configure a lighting scene or scheme based on one or more pre-defined lighting principles. The lighting control configurator may, in principle, operate in one or more different ways to produce the required lighting scene. The principles may take any form including lighting rules and/or equations, and/or computer programs wherein data is input and information about a lighting scene is output. This data about the lighting scene can then be used to generate the control signals, or may be the control signals themselves. The configurator may determine the lighting scene based only upon input data associated with one or more cognitive and/or physical states. Additionally or alternatively the configurator may use other data inputs to determine output lighting scenes.

The configurator may have a database of one or more stored predefined lighting principles wherein each lighting principle is associated with data associated with one or more cognitive and/or physical states. The predefined lighting principles and associated state data may be entered and stored by any suitable method. One example of inputting the data for the predefined lighting principle is a user selecting one or more cognitive and/or physical states and linking the said states, or a combination of the states, to a set of one or more pre-defined principles. In another example a user can select one or more cognitive and/or physical states and link the said states, or a combination of the states, to an action or a particular scene. An action could be any action in principle including the initiation of a request for more user state data or the delaying of the output of a particular lighting scene. In another example, the configurator may have access to one or more default behaviours which links known cognitive or physical states to suitable lighting scenes or behaviours.

The configurator may comprise separate processing hardware to the processor 12 of the apparatus or may be a process run by the processor 12 (for example by a software application). Once the scene has been designed, the relevant control signals to implement the scene are output from the lighting control output unit 7. The scene may be formed using one or a plurality of light sources 4. The light scenes may be static or dynamic (for example changing in time and/or changing with respect to further data inputs provided to the configurator). For example: a blue light scene may be chosen to help energize lethargic people or people with a low degree of arousal. Warm colours may be used to relax stressed people. Red hues may be used to help to inspire conversation in a quiet environment. Green and blue colours may be used to improve the mood of someone that is showing signs of depression. In one example where state data 10 from one user indicates the need for a lighting scene change, the configurator may use preferred lighting scenes of other users. This could be, for example, if the scene is associated with similar state data 10 as that recently received at the apparatus 2.

In another example, the apparatus 2, over time, may not be always be the same device, i.e. a first set of components may act as the apparatus 2 and then transfer the operation of lighting control to another set of components. For example, a user's mobile device within the control space may initially be the apparatus 2 and act as a 'mobile hub'. This mobile device may also perform sensing operations to detect other user devices. Which mobile device acts as the hub may be chosen in any suitable way. If a user is the first person to enter into a room or other controlled lighting space then one or more fixed devices in the room (such as light emitting devices 4 with communication equipment 24) may initiate a communication with the newly entered mobile device, once the communication is established that mobile becomes the hub running a simple software routine in the background performing all of the functions of the apparatus. In another example, when a new mobile device enters the room, a software application on the existing mobile can detect this new mobile device and see if it's in a better position to act as the hub, and transfer hub control or keep hub control with the same device. If the hub mobile device leaves the room it may transfer control and lighting history data to the other mobile device (for example over normal mobile phone communication channels) when signals between the original mobile hub and the lighting devices 4 become weak.

Light Control Data and Input Device

The light control input data 8 comprises data associated with the control of the one or more light emitting devices 4 that are controllable through the lighting control apparatus 2, such as but not limited to: data requesting light emitting devices 4 be turned on or off or emit at various illumination intensity levels between zero and full brightness and data requesting the emission of one or more hues of light.

The light control input data 8 is input via an input device 30. The input device 30 may be associated with a user, such as a person's mobile phone running light control software. The input device 30 may be configured to transmit a user identifier to the light control apparatus 2 wherein the user identifier contains information associated with the identity of the user who requested the light control input data 8 to be sent to the apparatus 2. The user identifier may comprise user profile data or comprise a reference to a user profile (e.g. stored in memory 32 of the apparatus 2) which may be accessed by the processor 12 of the apparatus 2 to determine a range of allowable control of the lighting system by that user. The user profile may for example comprise limitations on locations where the first user can control the lighting, limitations on the light effects the first user is allowed to set with the light emitting devices, limitations on the type of light emitting devices controllable by the first user etc. Such data may be used in the process of generating the one or more control signals 6 based upon the light control input data 8, the data associated with a physiological or cognitive state of the second user and the profile date of the first user.

The input device 30 may be any device in principle including a remote input device 30 spatially separated from the lighting control apparatus 2 or an input device 30 located upon or within the apparatus 2. The remote input device 30 may be, but is not limited to, a mobile device capable of receiving a user input request, processing the user input request and outputting light control input data 8 to the lighting control apparatus 2. The mobile device may be, for example a mobile phone or mobile computer such as a tablet or a laptop that contains one or more computing elements configured to cause the mobile device to function. The mobile device may also have a user data input facility (such as a touch screen, keyboard or other user interface) and communication apparatus 28 for transferring light control input data 8 to the lighting control apparatus 2. The remote input device may also be configured to run one or more software applications.

Another example of a remote input device 30 is a static input device configured to be fixable in one or more positions relative to the lighting control apparatus 2 and/or the light emitting devices 4. The static input device may be any of, but not limited to, a touch panel or light switch affixed to a supporting structure (such as a wall). An example of a light switch is a Philips Hue Tap Personal Wireless Lighting® Smart Switch.

The abovementioned mobile devices, lighting control apparatus 2 and optionally the input device 30 comprise one or more processors configured to perform the respective required operations described herein. More generally, these devices may have any suitable computing elements including, but not limited to, hardware, software and/or firmware. The hardware, software and/or firmware may in principle be of any type or take any configuration suitable to perform the computer processing requirements of the respective devices and apparatus 2. Such computation elements may include at least one or more data processors 12 and at least one memory devices 32. The computation elements may further include one or more controllers, one or more peripheral devices such as data input devices, display devices or communication devices 24, 28. The memory elements 32 may be volatile or non-volatile memory devices used to store electronic data and/or electronic computer program instructions. The computer program instructions may arrive via an electromagnetic carrier signal or be copied from a physical entity such as a computer program product, a non-volatile electronic memory device (e.g. flash memory) or a record medium such as a CD-ROM or DVD. Typically, the processor(s) 12 is coupled to both volatile memory and non-volatile memory 32. The computer program is typically stored in the non-volatile memory and is executed by the processor(s) using the volatile memory for temporary storage of data or data and instructions. Examples of volatile memory include RAM, DRAM, SDRAM etc. Examples of non-volatile memory include ROM, PROM, EEPROM, flash memory, optical storage, magnetic storage, etc. The terms 'memory', 'memory device' when used in this specification are intended to relate primarily to memory comprising both non-volatile memory and volatile memory unless the context implies otherwise, although the terms may also cover one or more volatile memories only, one or more non-volatile memories only, or one or more volatile memories and one or more non-volatile memories.

Light Emitting Devices

The lighting control apparatus 2 is configured to control one or more light emitting devices 4. When the apparatus 2 controls more than one light emitting device 4 the devices 4 may form part of a light control network. The term "network" as used herein refers to any interconnection of two or more devices 4 (including the lighting control apparatus 2) that facilitates the transport of information (e.g. for device control, data storage, data exchange, etc.) between any two or more devices 2, 4 and/or among multiple devices 2, 4 coupled to the network. Networks suitable for interconnecting multiple devices 2, 4 may include any network topology and employ any suitable communication protocol. Any one connection between two devices 2, 4 may represent a dedicated connection between the two devices 2, 4, or alternatively a non-dedicated connection. In addition to carrying information intended for the two devices 2, 4, such a non-dedicated connection may carry information not necessarily intended for either of the two devices 2, 4 (e.g., an open network connection). Networks of devices discussed herein may employ one or more wireless, wire/cable, and/or fibre optic links to facilitate information transport throughout the network.

Light emitting devices 4 are configured to have their light emission controlled by control signals 6 (typically electrical signals) sent from the lighting control apparatus 2. The light emitting devices may comprise communication apparatus 24 configured to receive the control signals 6 and maintain, or alter, their current light emission in accordance with the control signals 6. Examples of communication apparatus 24 include, but are not limited to, devices supporting wireless or wired communication channels such as wireless RF communications. This communication equipment 24 may alternatively be separate to but associated with the light emitting device 4, for example a radio receiver or transceiver connected to the light emitting device 4. The light emitting device 4 and lighting control apparatus 2 may utilise any suitable type of communication protocol to send and receive the control signals, such as ZigBee. Another example of the communication type between the light emitting devices 4 and the lighting control apparatus 2 may be using Power-Line Communication (PLC). The light emitting device 4 may be connected to intermediate control equipment that receives control signals 6 from the apparatus 2 and uses the control signals 6 to drive the light emitting device 4. This intermediate control equipment may be physically coupled to the light emitting device 4 or be remote from (i.e. separated from) the light emitting device 4.

The light emitting devices 4 may have one or more sources of light emission. Examples of light emitting devices 4 include, but are not limited to, room lights, light bulbs, LED lights and light emission apparatus on mobile devices such as optical displays. An example of a typical light bulb controlled by the lighting control apparatus 2 is a wireless LED light bulb containing a plurality of LED's. The plurality of LEDs may all have substantially the same output wavelength spectrum or may be a plurality of LED's wherein at least two of the different LED's output different wavelength spectral ranges. The light emitting device 4 may comprise multiple light sources such as two independent light sources, for example a Philips 'Hue Beyond' lamp having an up-light and a down-light.

The light emitting device 4 or plurality of light emitting devices 4 controlled by the lighting control apparatus 2 may be controlled according to various different light output parameters such as wavelength range (corresponding to changes in hue), output light intensity and time variance of wavelength or light intensity (i.e. outputting light in a pulsed manner). The light emitted by the light emitting device 4 may comprise any wavelength range in principle, but typically will cover wavelength ranges in the human visible spectrum corresponding to photopic vision (i.e. outputting wavelengths or wavelength ranges between 390 to 700 nm).

When multiple light emitting devices 4 are controlled by the lighting control apparatus 2, each device 4 may be controlled to output a particular wavelength range and/or intensity so that the combined light emission from all of the controlled devices 4 is tailored to a specific need.

Data Associated With a Physiological or Cognitive State of a User

The data 10 associated with a physiological or cognitive state of a user may be any data associated with one or more physiological or cognitive states of the human body.

Physiological states may include, but are not limited to: states of arousal, states or stages of sleep (for example sleep onset, REM sleep and non REM sleep, light sleep, deep sleep,).

Cognitive states may include, but are not limited to, consciousness, unconsciousness and psychological states. Psychological states may include, but are not limited to states of stress.

The data 10 may be data output from a monitoring device that, in turn, can be used to determine a user's physiological or cognitive state. This may be termed 'raw' data. The raw data may indicate or provide a bio marker for a physiological state from which a cognitive state may be subsequently determined.

Additionally or alternatively, the data 10 may be the actual data detailing/describing a physiological or cognitive state. This may also be referred to as 'inferred data'. One or more pieces of raw data may be used to determine the 'inferred data'. The determination of 'inferred data' may also be determined by sources of data other than raw data from a monitoring device, such as the time of day the raw data was measured.

Physiological states may be, for example, those states resulting from the operation of the human autonomic nervous system. Data 10 associated with a cognitive state may be data indicating a particular mental state, mental activities and/or mental processes. The data 10 may be sent to the lighting control apparatus 2 with an indication of the identity of the user associated with the data 10.

Some cognitive and physiological states may be associated with each other. For example a physiological state of arousal may lead to changes in skin conductance and increased heartbeat, similar to a psychological stressed state.

The data 10 associated with these states may be derived from any suitable monitoring equipment such as sensor devices. Monitoring equipment may be located remote from a user, such as an imaging apparatus (for example a visible or IR camera) that detects the pulse rate of a user or how hot the user is. Such monitoring equipment is typically located upon a monitoring device 26 worn by a user, such as but not limited to a watch, a waist band, or a smart clothing garment. These sensors may include one or more combinations of, but not limited to, optical sensors, pulse rate monitors, blood pressure monitors, motion sensors (such as accelerometers), skin temperature sensors, bio-impedance sensors including skin conductance sensors measuring galvanic skin response.

Examples of what sensors may measure include, but are not limited to, the following. Accelerometers may be used for sleep detection and detection of other physical activities such as physical exercise. Optical sensors may be used to detect the level of ambient light or other physical measurements of a user such as heart rate. Bio-impedance sensors may be used for measuring heart rate, respiration, galvanic skin response which in turn may be used for determining/estimating arousal level and/or mood.

Each of the sensors outputs data that can be used to determine or calculate a particular physiological or cognitive state of a user. Multiple sensor data readings may be used to determine an inferred state. For example, an active physiological state of a user may be determined using accelerometer signals indicating the person is currently moving in addition to signals from a pulse rate monitor, which together indicate that the detected movement is an energetic form of movement. A sleeping state of a person may be determined by data from a pulse rate monitor and/or an accelerometer indicating low user activity and a light sensor in proximity to the user indicating a low light level. A state of the person during an awake period can be inferred from the sleep quality that can be measured by the wearable device if worn during the night (i.e. when sleep). A stressed state of a person may be inferred using signals from any one or more of: a blood pressure monitor, a pulse monitor and a sensor monitoring galvanic skin response.

A state, for example a current state, may be also inferred at least from one or more previous historic inferred states of a user and/or one or more previous raw data measurements. This previous data may also be termed historical data. The current state may be determined by examining a plurality of raw data measurements wherein at least two of the raw data measurements are taken at different times prior to the determination of the state. Additionally or alternatively, the current state may be determined by plurality of previously determined states. The inferred state can also be obtained from other non-physiological data from other data sources.

Take, for example, a person who had a disrupted sleep because (s)he awoke many times and did not have enough deep sleep. The points during the sleeping period where the person awoke could be detected by a monitoring device such as wearable monitoring device with accelerometers. The device could monitor movement of the person during the sleep to ascertain when and how long periods of physical movement occurred. This raw data would be stored in a storage medium.

After the sleeping period, a device could determine that the person had a disrupted sleep by analysing the raw data collected during the sleeping period. This analysis could compare any of the number of disruptions, the duration of the disruptions and the magnitude of disruptions (i.e. degree of detected physical movement). The analysis may even add the sleep history of the last few days to determine whether or not the person has recently had a good night's sleep. After determining the nature/quality of the persons recent sleep, the apparatus 2 or system may react by activating a lighting scene or scheme that could help a person to awake faster or to avoid sleep inertia (which for example would not be necessary if the person had a good night sleep).

In this example, additional data from other sources may be used to determine a disrupted night's sleep, such as data indicating how late into the evening a local TV was on until, data indicating other noise producing activities such as the opening of the fridge, or doors, or uses of the bathroom multiple times in the night.

The data provided by the one or more sensors may be sent directly to the lighting control apparatus 2 or may be processed before being received by the lighting control apparatus 2. A user's state may be determined using the processor 12 of the apparatus 2 or by a remote device such as a wearable monitoring device 26, such as a watch. The monitoring device 26 may comprise hardware and software (similar to that described elsewhere herein) to process the sensor data and determine the user's physiological or cognitive state.

Monitoring devices 26 may be configured to interface and communicate with a mobile device, such as a user's mobile phone. The monitoring devices 26 may send sensor measurement data to the mobile device, wherein the mobile device processes the measured data, determines a user's physiological and/or cognitive state and, in turn, transmits the state data 10 to the lighting control apparatus 2. Such data processing may be performed using one or more software programs running on the mobile device.

The apparatus 2 may continually or periodically send out one or more broadcast signals to be received by local monitoring devices 26 requesting them to send the latest physiological/cognitive data and/or to instruct the monitoring devices 26 to make the necessary physiological/cognitive measurements of a user and send the appropriate data to the apparatus 2.

Operation

The apparatus 2 may use rules regarding specific states of a user to generate or adapt the control signals 6 sent to the light emitting devices 4.

Any of the rules used by the processor 12 to generate the control signals 6 may take into account data concerning the size of the lighting control space, the light emitting device 4 positions and/or the proximity of the users wearing monitoring devices 26 to the light emitting devices 4. Such data may already be accessible to the apparatus 2 (for example being loaded onto a memory device 32) or may be transmitted to apparatus 2 when physiological or cognitive state data 10 is transmitted to the apparatus 2. For example 'asleep' data may be sent to the apparatus 2 along with a user identifier and a user location. If the processor identifies the location of the user as being outside of the 'effect' of the light emitting devices 4 (for example being outside of the control space) it may ignore this particular physiological or cognitive state data 10.

Raw measurement data may be used to directly determine how the input light request is to be modified into a light output acceptable to those in the room. Either by having the raw data used to select a particular rule or lighting scheme or, for example, in an equation that relates light output to the input raw (or aggregated) data. One type of rule may be known as 'constraining control' or 'constraint' rule. Constraint rules may be implemented in a number of ways. This type of rule limits light control if a certain state or change of state is detected.

For example, light intensity cannot be set over 10% if the state 'asleep' is detected. To implement this rule the apparatus 2 may be initially configurable to output one or more control signals within a first control signal range, such as a signal range instructing light emitting devices 4 to output intensities between 0-100% of the maximum achievable brightness. The apparatus then determines a second control signal range based upon the data 10 associated with a physiological or cognitive state of the user. For example if the state 'asleep' is received, the second (modified) control signal range that the control signals are constrained to is the portion of the first control signal range between 0-10% of possible light intensity.

When a particular rule is implemented, the apparatus 2 may relate the light control data 8 to the output control signals 6 in a number of ways including modify the one or more light control input data values 8 to correspond to a value in the second control signal range. For example, when an intensity constraining rule is in effect, a light input control value 8 of 100% intensity may be modified to an output control signal 6 of 10% intensity whilst a light input control value 8 of 25% intensity may correspond to an out control signal of 2.5% intensity. In this manner, the user inputting the light control data 8 may therefore still control the variability of the lighting but only to an extent acceptable to the physiological or cognitive state of another user in the same environment. This rule may use one or more scaling factors to change (up or down) the light control input data 8 into scaled output control data 6 used to drive the lights. One constraint rule may be a 'capped' rule where the range of an output light intensity is limited. For example, intensity is limited from 0-10% in case someone is 'asleep'. Any light intensity value above 10% is automatically capped to 10%. Another example could be if someone is studying and the physiological state of 'active engaged' is measured, then the light output range is limited between 80-100%. Values lower than 80% are capped at 80%. The colour range may also be constrained. Constraints may be stacked and combined to make advanced lighting scenes.

Another constraining rule could be a fixed or 'Static' rule whereby: values cannot be changed if a state is detected or a change in state is detected. For example, if an 'active engaged' state is inferred; the colour of the light cannot be changed and is fixed at a colour temperature, for example 6000K.

For a group of lamps outputting a combined light scene, the overall scene may be constrained rather than single individual light sources.

In principle the light control input data 8 received by the apparatus 2 may be associated with a particular desired light output state (which may be related to any number of light output variables such as brightness and colour). The rules invoked by the apparatus 2 may lead to this request: not being output, being output because the request was within an acceptable range of light output states, or output by having the requested lighting output state modified to be in accordance with the rule (for example being scaled up or down or capped).

In one example, the apparatus 2 may only permit light control input data 8 to be accepted (or passed through) into a control signal 6 when those input data requests are within the acceptable lighting regimes dictated by the physiological or cognitive state data 10. For example, a hue constraining rule of 'no red' is in effect because physiological or cognitive state data 10 has been received indicating that a person is in an aggravated state and should not see red light. Another person submits lighting control input data 8 into the apparatus 2 requesting that red, blue and green hues are output in different areas of the room. The apparatus 2 then only permits output control signals 6 causing the green and blue hues to be emitted.

Another type of rule may be known as 'default states'. This type of rule uses a predetermined light setting (for example a setting made by a user) if a certain state is detected and/or when a change of state is detected. For example, if a change of state is detected from awake to asleep, then a predetermined behaviour is activated: e.g., dim lights to 10%.

When operating using this rule, the apparatus 2 is configured to select a predetermined control signal 6 based upon the data 10 associated with a physiological or cognitive state of a user and output said predetermined control signal 6 to the light emitting device 4. Using a predetermined control signal associated with a physiological or cognitive state allows a user to make sure that a known lighting effect is output when he or she is in a particular mood or state of activity. This can be particularly important for those who are very sensitive to changes in lighting effects and want to know that only a specific lighting condition is output when they are in a particular physiological or cognitive state. For example, a user may know that he or she always needs complete darkness when sleeping, so the predetermined control signal may be to have zero light intensity when he or she is in this state.

The pre-determined information may be held upon a memory device 32 within the apparatus 2 or may be transmitted to the apparatus 2 from another storage device. The pre-determined information may be input by the user or may be generated by the apparatus 2 (for example generating the default state by examining the lighting scheme history of the user).

Figure 3:
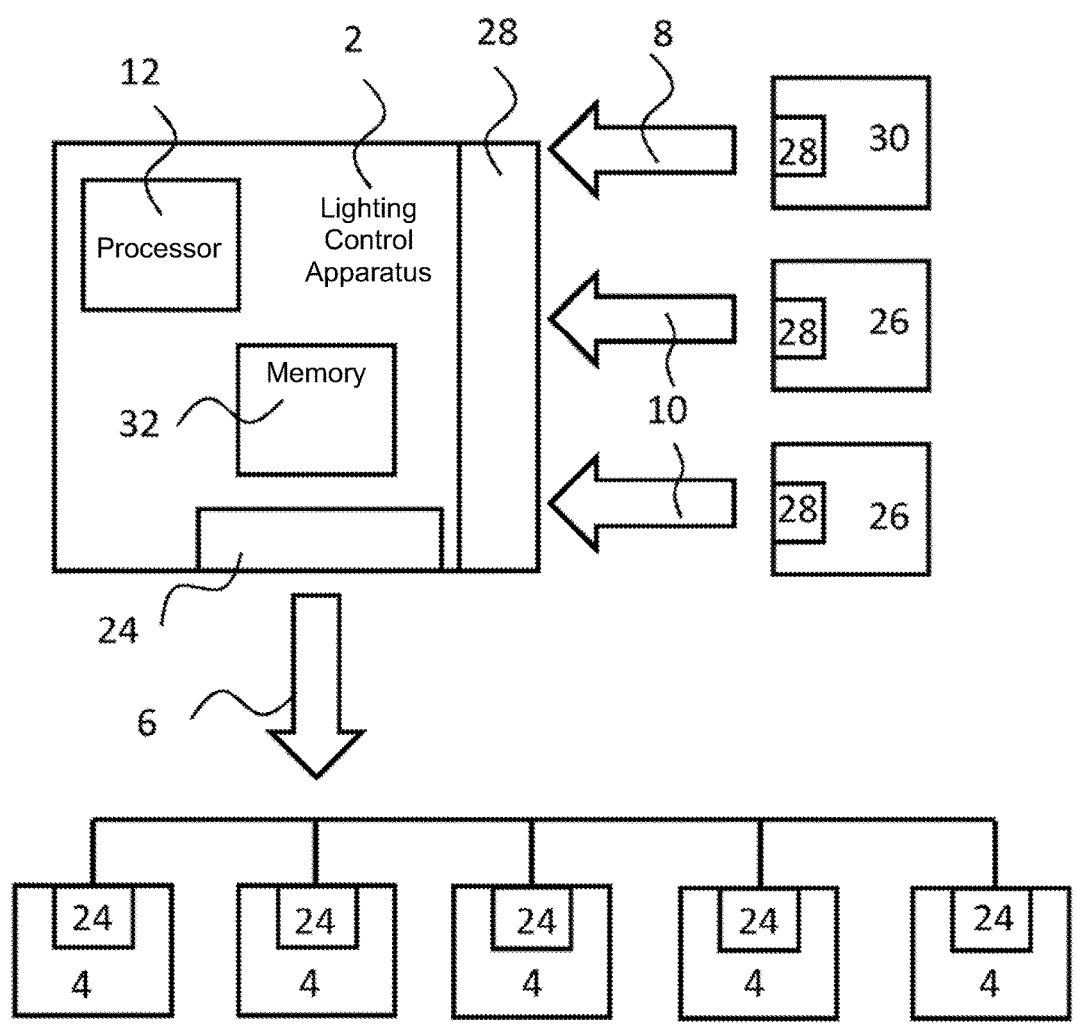
FIG. 3 shows an example of a lighting control apparatus used to control a plurality of light emitting devices.

FIG. 3 shows an example of a lighting control apparatus 2. The apparatus 2 comprises a processor 12, memory 32, a communication device 24 for sending control signals to a network of light emitting devices 4 and a communication device 28 for receiving data from multiple remote devices 26, 30.

Figure 5:
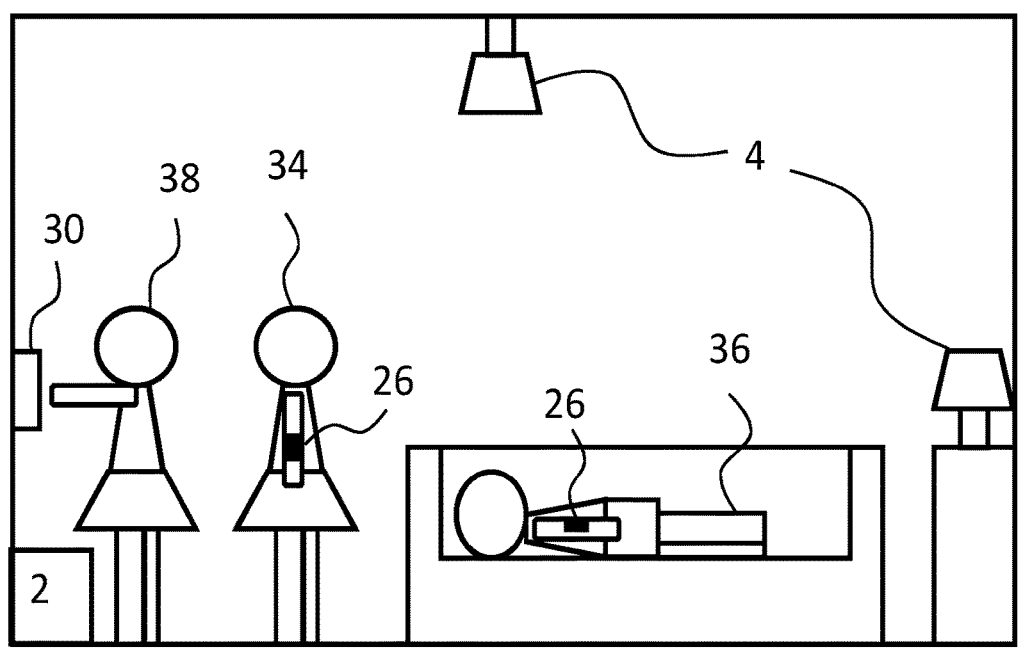
FIG. 5 shows a diagrammatic representation of a room using a lighting control apparatus.

The remote devices 26, 30 shown in this example include two wearable monitoring devices 26, each worn by a different user and an input device 30 for sending light control input data 8 to the apparatus 2. The input device 30 in this example is a wall mounted light switch allowing a user to request different lighting schemes. FIG. 5 shows a schematic of a room depicting this situation where the apparatus 2 is located on the floor and wirelessly in communication with the wall switch 30, two light emitting devices 4 (a first lamp on a piece of furniture and a second overhead lamp on the ceiling) and two wrist worn monitoring devices 26 (one worn by a person 34 standing up, the other by a person 36 asleep on a sofa). Another user 38 is entering the lighting request onto the wall mounted switch 30.

The apparatus 2 receives physiological state data 10 from two users 34, 36 wearing the monitoring devices 26. The wearable monitoring devices 26 send user identifiers along with the physiological data 10. The processor 12 analyses both sets of physiological data 10 and determines that a constraining control rule of 'light intensity only up to 5%' should be implemented because the data 10 from one monitoring device 26 indicates one user 34 to be active and awake, whilst the data 10 from the other monitoring device 26 indicates that user 36 is asleep. The third user 38 enters a request for 100% intensity green light using the wall mounted switch 30. The processor 12 then generates control signals 6 to send to the network of light emitting devices 4 to emit green light at 5% of the maximum possible brightness.

In an alternative example, the user 38 inputting the light control data 8 may use a device 30 with a user interface, such as a mobile phone with a display screen. Upon determining the use of the constraining rule of 'light intensity up to 5%', the apparatus 2 sends information back to the mobile device to display information to the third user 38 that light can only be set to a brightness of up to 5% due to another person 36 in the same room being asleep.

Figure 4:
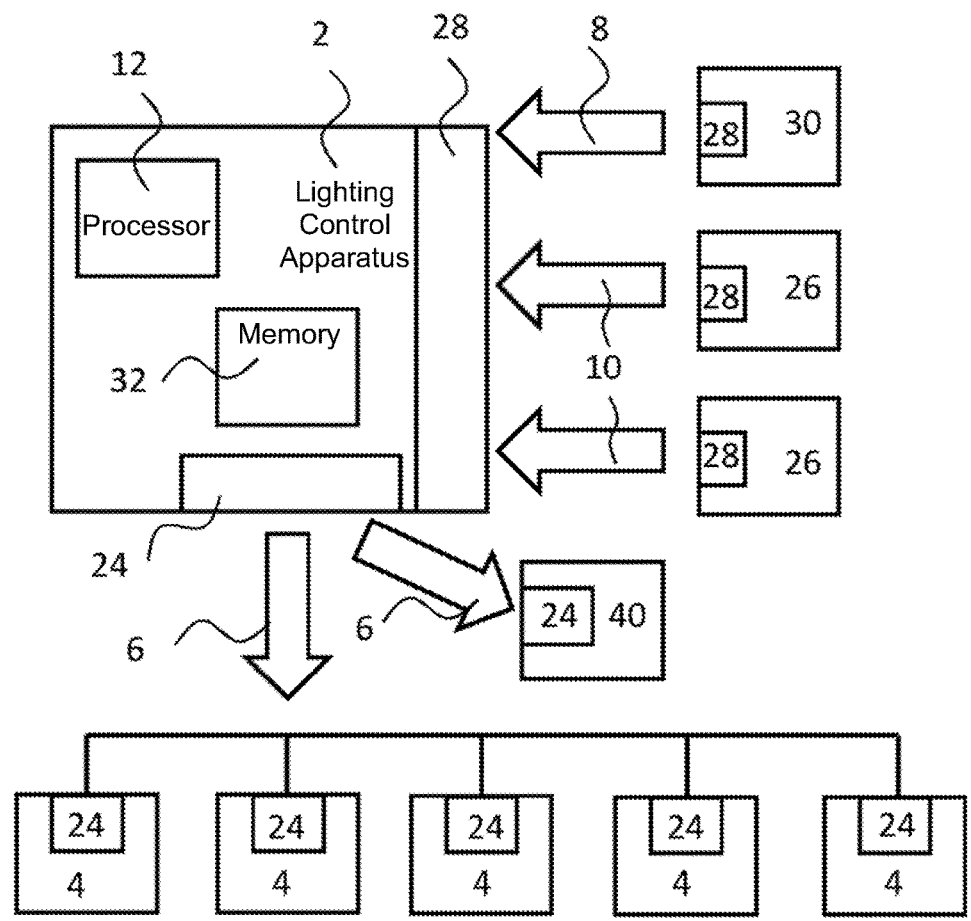
FIG. 4 shows another example of a lighting control apparatus used to control a plurality of light emitting devices.

FIG. 4 shows another example of a lighting control apparatus 2 similar to the example of FIG. 3. The example in FIG. 4 also shows a further mobile light emitting device 40 controllable by the apparatus 2. This mobile light emitting device 40 may be a user's mobile phone. The apparatus 2 in this example recognises that the light emitting device 40 is a mobile phone through one or more communications between the apparatus 2 and the phone 40 and adapts the control signals 6 to take into account the mobile device's limited ability to output high intensity light. Within the same scenario as described in FIG. 3, the apparatus 2 also sends a control signal 6 to this mobile device 40 to only output green display screen light of 50% of total intensity that the phone can nominally output.

It will be appreciated that the term "comprising" does not exclude other elements or steps and that the indefinite article "a" or "an" does not exclude a plurality. A single processor may fulfil the functions of several items recited in the claims. The mere fact that certain measures are recited in mutually different dependent claims does not indicate that a combination of these measures cannot be used to an advantage. Any reference signs in the claims should not be construed as limiting the scope of the claims.

Although claims have been formulated in this application to particular combinations of features, it should be understood that the scope of the disclosure of the present invention also includes any novel features or any novel combinations of features disclosed herein either explicitly or implicitly or any generalisation thereof, whether or not it relates to the same invention as presently claimed in any claim and whether or not it mitigates any or all of the same technical problems as does the parent invention. The applicants hereby give notice that new claims may be formulated to such features and/or combinations of features during the prosecution of the present application or of any further application derived therefrom.

The invention claimed is:

1. A lighting control apparatus for controlling light emitted from at least one light emitting device using one or more control signals;
    the apparatus comprising:
    a lighting input receiving device for receiving light control input data associated with a first user, the light control input data being a lighting request input for controlling a lighting effect light emitted from the at least one light emitting device;
    a user data receiving device for receiving data associated with a physiological or cognitive state of a second user;
    a processor for generating the one or more control signals based upon the light control input data and the data associated with the physiological or cognitive state of the second user;
    a lighting control output unit configured to output the one or more control signals.

2. An apparatus as claimed in claim 1, wherein the at least one light emitting device is located within a lighting space:
    the apparatus being configured to receive data indicating the presence of the second user within the lighting space; and,
    the processor being configured to generate the one or more control signals further based on the indicating data.

3. An apparatus as claimed in claim 1 wherein:
    the light control input data is associated with a first light output state from the at least one light emitting device;
    the one or more control signals are associated with a second light output state from the at least one light emitting device; the first light output state being different from the second light output state.

4. An apparatus as claimed in claim 1 wherein:
    the at least one light emitting device is configured to output a plurality of different light output states;
    the light control input data corresponding to a light output state within a first range of light output states; and,
    the processor is configured to generate the one or more control signals to correspond to one or more light output states within a second range of light output states; the second light output state range being different from the first light output state range;
    the processor being configured to:
    modify the light control input data to correspond to a light output state within the second light output state range; and,
    generate the one or more control signals using the modified light control input data; or,
    generate the one or more control signals using the light control input data only if the light control input data corresponds to a light output state within the second light output state range.

5. An apparatus as claimed in claim 1; wherein the processor is configured to:
   select predetermined control information based upon the data associated with the physiological or cognitive state of the second user; and,
   generate the one or more control signals using the selected predetermined control information.

6. An apparatus, as claimed in claim 1 wherein the processor is configured to:
   access a predetermined set of control information based upon the data associated with the physiological or cognitive state of the second user; and,
   select control information from the predetermined set based on the light control input data; and,
   generate the one or more control signals using the selected control information.

7. An apparatus as claimed in claim 1 wherein the lighting control output unit is configured to output one or more control signals to a lighting control network comprising a plurality of light emitting devices, wherein the plurality of light emitting devices includes the at least one light emitting device.

8. A system comprising a lighting control apparatus as claimed in claim 1, the system further comprising a wearable device configured to:
   be worn on the second user; and,
   monitor a physiological or cognitive state of the second user; and,
   output the data associated with the physiological or cognitive state of the second user to the user data receiving device.

9. A system as claimed in claim 8, further comprising a light control input device configured to:
   receive an input request from the first user; the request associated with the light control input data;
   output the light control input data to the lighting input receiving device.

10. A system as claimed in claim 8 further comprising the at least one light emitting device.

11. A method for controlling light emitted from at least one light emitting device using one or more control signals, the method comprising the steps of, in any order:
    receiving light control input data associated with a first user, the light control input data being a lighting request input for controlling a lighting effect light emitted from the at least one light emitting device;
    receiving data associated with a physiological or cognitive state of a second user;
    generating, using a processor, one or more control signals based upon the light control input data and the physiological or cognitive state data;
    outputting the one or more control signals to the at least one light emitting device.

12. A method as claimed in claim 11, wherein the at least one light emitting device is located within a lighting space; the method further comprising the steps of:
    receiving data indicating the presence of the second user within the lighting space; and,
    generating the one or more control signals further based on the indicating data.

13. A method as claimed in claim 11 wherein:
    the light control input data is associated with a first light output state from the at least one light emitting device;
    the one or more control signals are associated with a second light output state from the at least one light emitting device; the first light output state being different from the second light output state.

14. A method as claimed in claim 11 wherein the least one light emitting device is configured to output a plurality of different light output states and the light control input data corresponds to a light output state within a first range of the plurality of different light output states, the method comprising the steps of:
    generating the one or more control signals to correspond to one or more light output states within a second range of the plurality of different light output states; the second light output state range being different from the first light output state range;
    and
    (i) modifying the light control input data to correspond to a light output state within the second light output state range and generating the one or more control signals using the modified light control input data;
    or,
    (ii) generating the one or more control signals using the light control input data only if the light control input data corresponds to a light output state within the second light output state range.

15. A method as claimed in claim 11 further comprising the steps of:
    selecting predetermined control information based upon the data associated with the physiological or cognitive state of the second user; and,
    generating the one or more control signals using the selected predetermined control information.

* * * * *